United States Patent [19]

Watanabe

[11] 4,397,398
[45] Aug. 9, 1983

[54] COMPACT COLLAPSIBLE CONTAINERS

[75] Inventor: Mikio Watanabe, Tokyo, Japan

[73] Assignee: Tokyo Pet Cage Co., Ltd., Japan

[21] Appl. No.: 312,819

[22] Filed: Oct. 19, 1981

[30] Foreign Application Priority Data

Jul. 13, 1981 [JP] Japan .......................... 56-103603[U]

[51] Int. Cl.³ .................. A01K 1/00; A45C 11/20;
B65D 6/18; E05C 7/04
[52] U.S. Cl. ..................................... 220/7; 220/6;
220/94 R; 220/318; 206/541; 206/549; 229/6
A; 292/19; 292/300; 119/19; 190/43; 150/52 R
[58] Field of Search ............... 206/541, 546, 548, 549,
206/550; 220/4 F, 6, 7, 94, 318; 229/30, 6 A;
190/43, 55 R; 150/52 R; 119/19; 292/19, 18,
87, 300

[56] References Cited

U.S. PATENT DOCUMENTS

| | | | |
|---|---|---|---|
| 1,313,691 | 8/1919 | Hixson | 119/19 |
| 2,538,778 | 1/1951 | Halpin | 119/19 |
| 2,606,652 | 8/1952 | Jaquette et al. | 206/549 |
| 2,611,476 | 9/1952 | Coney | 220/94 R |
| 3,173,465 | 3/1965 | Pastini | 190/43 |
| 3,994,372 | 11/1976 | Geller et al. | 190/43 |
| 4,220,119 | 9/1980 | Albright | 119/19 |

FOREIGN PATENT DOCUMENTS 2035034 6/1980 United Kingdom ................. 119/19

Primary Examiner—George E. Lowrance
Assistant Examiner—Jimmy G. Foster
Attorney, Agent, or Firm—Ostrolenk, Faber, Gerb & Soffen

[57] ABSTRACT

Compact collapsible containers wherein front and rear end plates having a semi-circular upper half and flexible right and left side plates having transverse grooves and long slots over the middle and upper parts, are hinged to a bottom box via flexible fold parts, wherein the front and the rear ends of the side plates are adapted to be fitted into grooves formed in the peripheries of the end plates, and wherein the top ends of the side plates and the central tops of the end plates are adapted to be connected in the top by means of a connection member by engaging engage pieces formed in the top ends of the side plates and engage projections attached to the central tops of the ends plates with engage cutouts and engage holes which are formed in the sides and the ends of the connection member.

8 Claims, 11 Drawing Figures

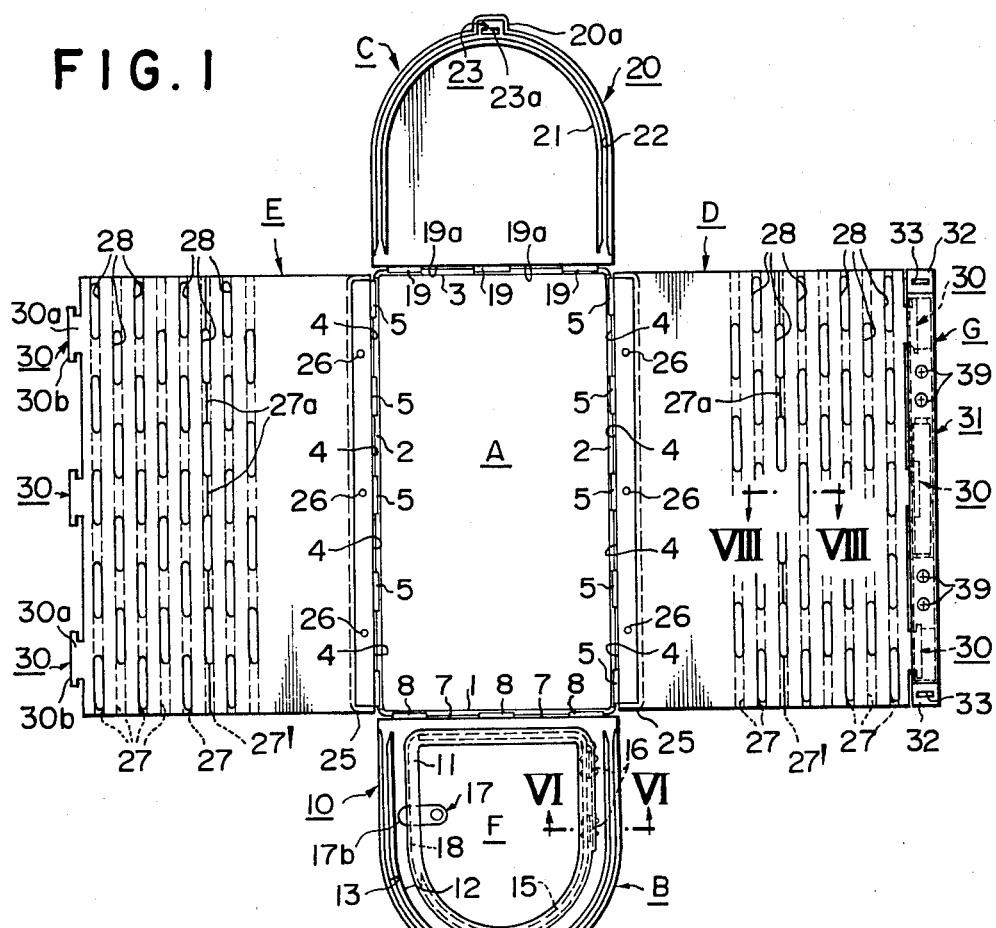
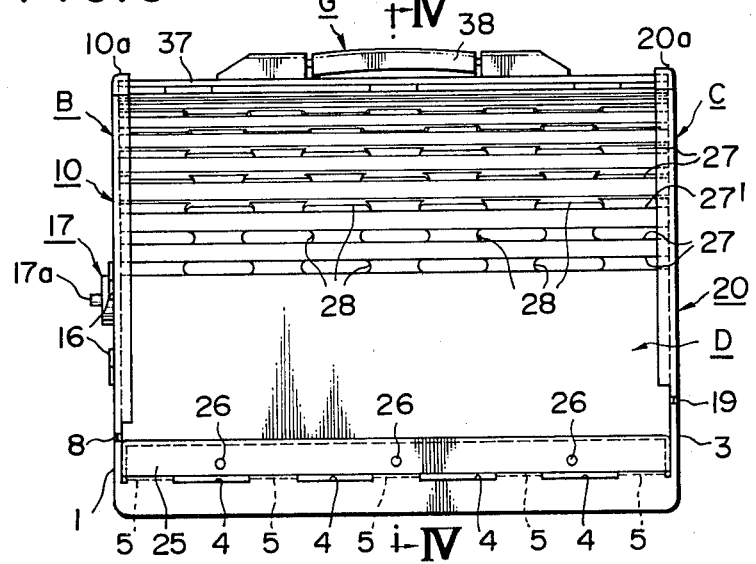

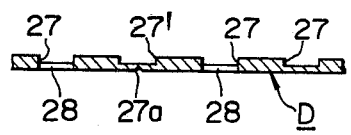
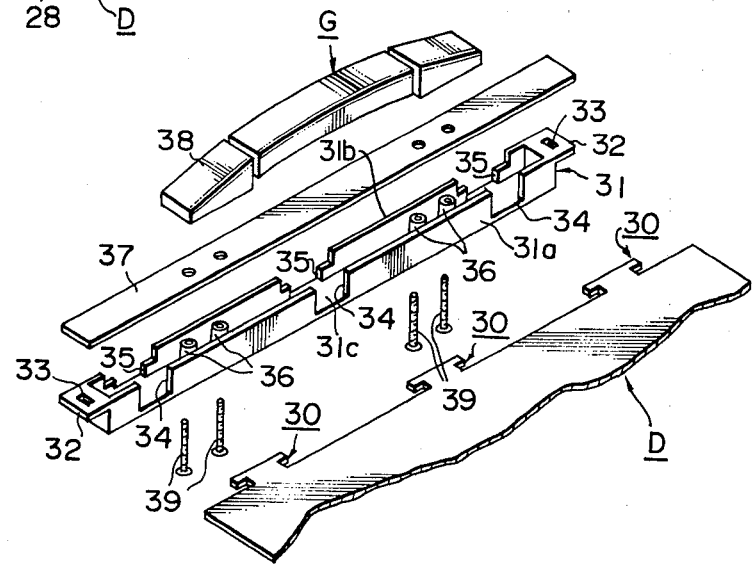
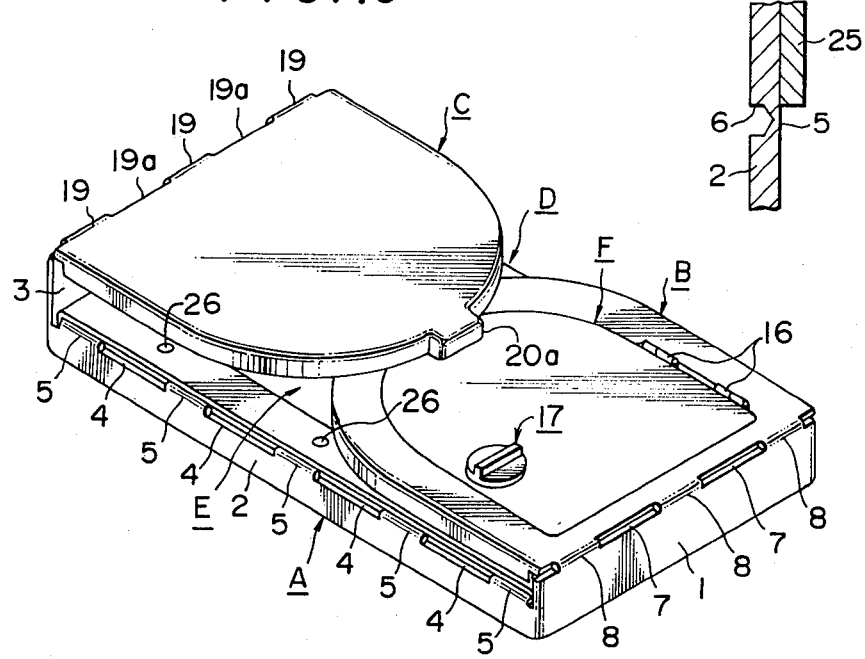

COMPACT COLLAPSIBLE CONTAINERS

BACKGROUND OF THE INVENTION

The present invention relates to compact collapsible containers for handling small animals, foods, personal effects and miscellanious goods, which are foldable into a compact unit when not in use or for storage and carrying, and which may be readily extended for use.

There are various conventional collapsible containers for packing small animals, foods, personal effects and miscellanious goods, which can be folded to save space when being handled empty. Basically, the conventional collapsible containers comprise a base, two sides and two ends which can be folded down, and fixing elements for securing together the sides and the ends. However, such conventional collapsible containers are not stable when they are extended for use, and require particular fixing elements. Further, they are often complicated to manufacture, and are rather inconvenient to clean up.

SUMMARY OF THE INVENTION

It is an object of the present invention to provide compact collapsible containers for handling small animals, foods, personal effects and miscellanious goods, which are stable and light and are simple in construction, and which do not need particular complicated fixing elements.

According to the present invention there is provided compact collapsible containers comprising (a) an open-top rectangular-solid-formed bottom box, (b) a front end plate, hinged to the front end of the bottom box via a transverse flexible fold apart, having a semi-circular upper half, a groove in its inner periphery, and an engage projection in its central inner top, (c) a rear end plate of a similar form and construction to the front end plate, hinged to the rear end of the bottom box via a transverse flexible fold part which is positioned somewhat higher than that of the front end plate, (d) a rectangular flexible right side plate, hinged to the right side of the bottom box via a transverse flexible fold part which is positioned somewhat lower than that of the front end plate, having a plurality of transverse grooves and transverse long slots over the middle and the top parts, and engage pieces in its top end, (e) a rectangular flexible left side plate having the same form and construction as the right side plate, hinged to the left side of the bottom box, and (f) a connection member of an open-top channel form comprising right and left sides, one of which is provided with engage cutouts, and the other of which is provided with detachable engage cutouts, and front and rear coupling pieces, each having an engage hole and projecting outwards horizontally from the front or the rear end of the connection member, wherein the free end of one side plate is adapted to be fixed to the one side of the connection member by engaging the engage pieces of the one side plate with the engage cutouts of the one side of the connection member, and the free end of the other side plate is adapted to be detachably connected to the other side of the connection member by detachably engaging the engage pieces of the other side plate with the detachable engage cutouts of the other side of the connection member, wherein the front and the rear ends of the two side plates are adapted to be fitted into the grooves of the front and the rear end plates, respectively, and wherein the engage projections of the front and the rear end plates are adapted to be fitted into the engage holes of the coupling pieces of the connection member.

BRIEF DESCRIPTION OF DRAWINGS

In order that the present invention may be better understood, a preferred embodiment thereof will be desdribed with reference to the accompanying drawings, in which:

FIG. 1 is an exploded view of one embodiment of compact collapsible containers according to the present invention;

FIG. 3 is a right side view of the compact collapsible containers shown in FIG. 1;

FIG. 8 is an enlarged longitudinal cross-section, taken along the line VIII—VIII of FIG. 1;

FIG. 9 is an exploded perspective view of a handle part of the compact collapsible containers of FIG. 1;

FIG. 10 is a perspective view of the folded compact collapsible containers of FIG. 1; and FIG. 11 is an enlarged longitudinal cross-section, taken along the line XI—XI of FIG. 5.

DESCRIPTION OF A PREFERRED EMBODIMENT

Figure 2:
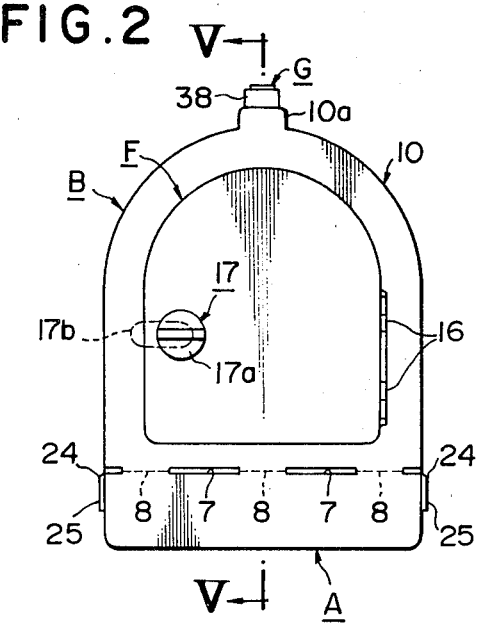
FIG. 2 is an elevational view of the compact collapsible containers shown in FIG. 1.
Figure 4:
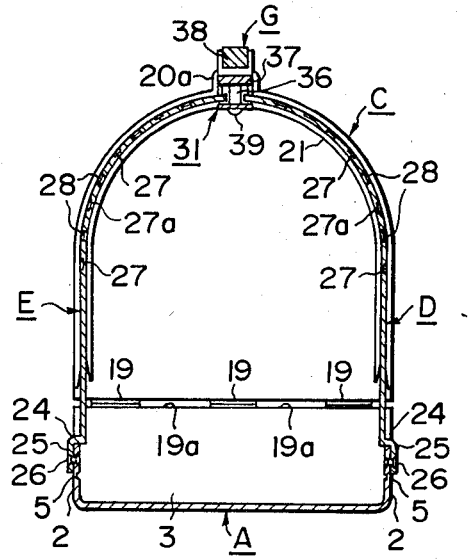
FIG. 4 is a longitudinal cross-section, taken along the line IV—IV of FIG. 3.
Figure 5:
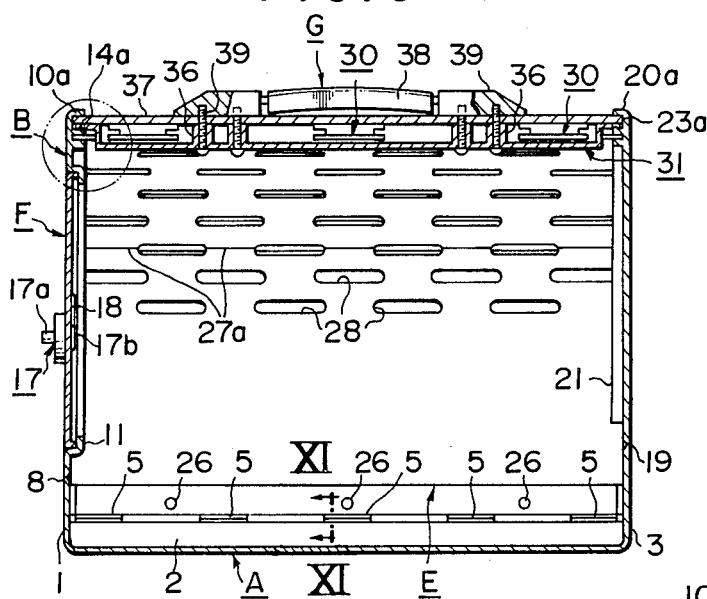
FIG. 5 is a longitudinal cross-section, taken along the line V—V of FIG. 2.

Referring now to the drawings there is shown in FIGS. 1-11 compact collapsible containers for handling small animals, foods, personal effects and miscellanious goods according to the present invention.

FIG. 1 is an exploded view of one embodiment of compact collapsible containers according to the present invention, which are made of plastics, comprising an open-top thin rectangular-solid-formed bottom box (A), a front end plate (B) having a semi-circular upper half, hinged to the front end of the bottom box (A) via a flexible fold part, a rear end plate (C) having the similar form to the front end plate (B), hinged to the rear end of the bottom box (A) via a flexible fold part, a flexible right side plate (D) having a rectangular form, hinged to the right side of the bottom box (A) via a flexible fold part, a flexible left side plate (E) having the same construction as the right side plate (D), hinged to the left side of the bottom box (A) via a flexible fold part, a door (F) pivotally attached to the front end plate (B), and a support handle part (G) which is partially made of a metallic material and which is positioned in the top of the collapsible containers.

As shown in FIGS. 2-5, a front end 1 and right and left sides 2 of the bottom box (A) have the same height, but a rear end 3 thereof is somewhat higher than those. At a middle height of the sides 2, a plurality of transverse long slots 4 are aligned horizontally along a thin fold part 5, and, as shown in FIG. 11, a horizontal groove 6 is cut along the entire length of the inside of the fold part 5.

The front end plate (B) having a central large opening in its center is integrally connected to the top end of the front end 1 of the bottom box (A) via a fold part 8 having a plurality of transverse long slots 7, which has the same construction as the fold part 5 of the sides 2 and which is positioned somewhat higher than the fold part 5.

Figure 6:
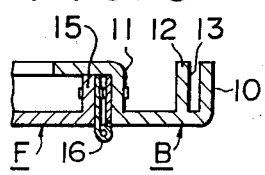
FIG. 6 is an enlarged transverse cross-section, taken along the line VI—VI of FIG. 1.

As shown in FIGS. 1 and 6, an outer peripheral projection 10 and inner peripheral angle 11 are integrally attached to the front end plate (B), which project inside perpendicular to the rear surface thereof, along the outer periphery except its bottom and the inner periphery defining the central opening. Inside the outer peripheral projection 10, another projection 12 projects in parallel with the outer peripheral projection 10 at a certain distance, so that the outer peripheral projection 10 and another projection 12 may constitute a groove 13 therebetween.

Figure 7:
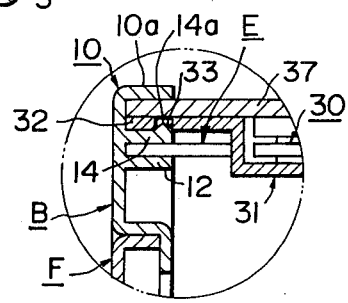
FIG. 7 is an enlarged detail view of the X part of FIG. 5.

As shown in FIG. 7, the front end plate (B) is provided with a top projection 10a having a channel-form, which projects upwards from its center top, and the outer peripheral projection 10 runs continuously along the outer edge of the top projection 10a. Inside the top projection 10a an engage piece 14 projects inside perpendicular to the rear surface of the front end plate (B) on the extension line of the circular line of the outer peripheral projection 10, and the engage piece 14 is provided with an engage projection 14a having a triangular form in its upper rear free end.

The door (F) is pivotally fitted in the central opening of the front end plate (B) via hinges 16 which couple the right side of the inner peripheral angle 11 of the front end plate (B) and an outer peripheral projection 15 projecting inside from the periphery of the door (F), as shown in FIG. 6.

In the left hand side of the door (F), as shown in FIG. 2, lock means 17 comprising a knob 17a and a locking lever 17b is rotatably mounted. When the knob 17a of the lock means 17 is pivoted counterclockwise, the locking lever 17b is engaged with a longitudinal long slot 18 formed in the left hand side of the inner peripheral angle 11 of the front end plate (B), thereby closing and locking the door (F).

Then, in order to open the door (F), the lock of the lock means 17 is released by pivoting the knob 17a clockwise, accordingly.

The rear end plate (C) is integrally connected to the top end of the rear end 3 of the bottom box (A) via a fold part 19 having a plurality of transverse long slots 19a, which has the same construction as the fold part 8 of the front end 1 and which is positioned somewhat higher than the fold part 8.

The rear end plate (C) is provided with an outer peripheral projection 20 and another projection 21 which constitute a groove 22 therebetween, in the quite same manner as those of the front end plate (B). The rear end plate (C) is provided with a top projection 20a and an engage piece 23 with an engage projection 23a, in the quite same manner as the front end plate (B).

The right side plate (D) includes a mount plate 25 having a small height in its bottom via a transverse stop part 24. The mount plate 25 projecting somewhat outwards is secured to the right side 2 in its outer upper part above the fold part 5 by means of tacks 26, as clearly shown in FIG. 5.

As shown in FIG. 8, a plurality of transverse grooves 27 are formed on the outer surface of the right side plate (D) from its middle part to its top end in parallel at a certain interval, and a plurality of transverse long slots 28 are cut in the transverse grooves 27 at a certain distance so that they may be aligned alternately per each transverse groove 27 in the horizontal direction.

In a fold part in which one groove 27' is positioned in the middle height of the right side plate (D), a fine horizontal groove 27a is cut on the inner surface along the groove 27' so that the right side plate (D) may be folded along the fine horizontal groove 27a. Foots 30a of three T-shaped engage pieces 30 are integrally connected to the top end (the right side edge of FIG. 1) of the right side plate (D) in its central and front and rear end portions.

The left side plate (E) having the same construction as the right side plate (D), is mounted to the left side 2 of the bottom box (A), in the same manner as the right side plate (D).

FIG. 9 shows the support handle part (G) and a connection member 31 of an open-top channel form which is made of plastics. Horizontal coupling pieces 32 project frontward and rearward from the upper front and rear ends of the connection member 31. A rectangular engage hole 33 is formed in each horizontal coupling piece 32.

The connection member 31 comprises right and left sides 31a and 31b and a bottom 31c. The right side 31a is provided with these rectangular cutouts 34 whose width conforms that of the foot 30a of the T-shaped engage piece 30, and the left side 31b is provided with three T-shaped cutouts 35 whose upper and lower widths conform those of the upper part and the foot 30a of the T-shaped engage piece 30. A plurality of bosses 36, each having a vertical hole therethrough, erect on the bottom 31c of the connection member 31.

After the foots 30a of the T-shaped engage pieces 30 of the right side plate (D) fitted in the corresponding rectangular cutouts 34, a metallic plate 37 having the similar length and width to those of the connection member 31 and a handle 38 are put on the upper surface of the connection member 31, and are secured thereto by means of screw bolts 39 which are inserted into female screws tapped on the bottom of the handle 38 through the vertical holes of the bosses 36 and the metallic plate 37, and are screwed up.

Then, the two side plates (D) and (E) are erected by folding at the fold parts 5, and the upper halfs of the two side plates (D) and (E) are rounded inside. Then, the T-shaped engage pieces 30 of the left side plate (E) is fitted into the T-shaped cutouts 35 of the connection member 31, thereby coupling the two side plates (D) and (E).

Next, the front end plate (B) is erected by folding it at the fold part 8, and the front ends of the two side plates (D) and (E) are fitted into the groove 13 of the front end plate (B). Then, as shown in FIG. 7, the front ends of the metallic plate and the horizontal coupling piece 32 of the connection member 31 are inserted into the space between the top piece of the top projection 10a and the engage piece 14 so that the engage projection 14a of the engage piece 14 may be engaged with the engage hole 33 of the horizontal coupling piece 32 from the underside.

Then, the rear end plate (C) is erected and fitted onto the two side plates (D) and (E) and the connection member 31 in the same manner as the front end plate (B), thereby assembling the container for use, as shown in FIGS. 2 and 3.

When the container is collapsed, first, the front and the rear end plates (B) and (C) are disengaged from the two side plates (D) and (E) and the connection member 31 by pulling outwards, and then, the T-shaped engage pieces 30 of the left side plate (E) are separated from the connection member 31 by pulling out of the T-shaped cutouts 35 of the connection member 31.

Next, the upper half part of the right side plate (D) together with the connection member 31 is folded down inside horizontally along the fine groove 27a at the groove 27, and then the folded right side plate (D) is further folded down inside horizontally at the fold part 5 onto the bottom box 1. Then, the left side plate (E) is folded down inside onto the folded right side plate (D) in the same manner as the right side plate (D).

Then, the front end plate (B) is horizontally folded down inside onto the left side plate (E) folded at the fold part 8, and then the rear end plate (C) is horizontally folded down inside onto the front end plate (B) folded at the fold part 19, thereby obtaining a folded compact collapsible container, as shown in FIG. 10.

Although the present invention has been described with reference to a preferred embodiment thereof, various changes and modifications can be made by those skilled in the art without departing from the scope of the present invention.

What is claimed is:

1. Compact collapsible containers comprising:
   (a) an open-top rectangular-solid-formed bottom box;
   (b) a front end plate, hinged to the front end of the bottom box via a transverse flexible fold part, having a semi-circular upper half, a groove in its inner periphery, and an engage projection in its central inner top;
   (c) a rear end plate of a similar form and construction to the front end plate, hinged to the rear end of the bottom box via a transverse flexible fold part which is positioned somewhat higher than that of the front end plate;
   (d) a rectangular flexible right side plate, hinged to the right side of the bottom box via a transverse flexible fold part which is positioned somewhat lower than that of the front end plate, having a plurality of transverse grooves and transverse long slots over the middle and the top parts, and engage pieces in its top end;
   (e) a rectangular flexible left side plate having the same form and construction as the right side plate, hinged to the left side of the bottom box; and
   (f) a connection member of an open-top channel form comprising right and left sides, one of which is provided with engage cutouts, and the other of which is provided with detachable engage cutouts, and front and rear coupling pieces, each having an engage hole and projecting outwards horizontally fron the front or the rear end of the connection member, wherein the free end of one side plate is adapted to be fixed to the one side of the connection member by engaging the engage pieces of the one side plate with the engage cutouts of the one side of the connection member, and the free end of the other side plate is adapted to be detachably connected to the other side of the connection member by detachably engaging the engage pieces of the other side plate with the detachable engage cutouts of the other side of the connection member, wherein the front and the rear ends of the two side plates are adapted to be fitted into the grooves of the front and the rear end plates, respectively, and wherein the engage projections of the front and the rear end plates are adapted to be fitted into the engage holes of the coupling pieces of the connection member.

2. Compact collapsible containers as defined in claim 1, wherein each side plate is provided with a horizontal fold part in its middle height.

3. Compact collapsible containers as defined in claims 1, or 2, wherein each engage piece of the side plates comprises a T-shaped projection form, and wherein each detachable engage cutout of the connection member comprises a T-shaped cutout.

4. Compact collapsible containers as defined in claims 1, or 2, wherein the front end plate is provided with a door.

5. Compact collapsible containers as defined in claim 3, wherein the front end plate is provided with a door.

6. Compact collapsible containers as defined in claims 1, 2 or 5, wherein a support handle is mounted to the connection member.

7. Compact collapsible containers as defined in claim 3, wherein a support handle is mounted to the connection member.

8. Compact collapsible containers as defined in claim 4, wherein a support handle is mounted to the connection member.

* * * * *